(12) United States Patent
Hu et al.

(10) Patent No.: US 10,662,356 B2
(45) Date of Patent: May 26, 2020

(54) METHOD OF USING A TONER AS A PRINTABLE ADHESIVE

(71) Applicant: Xerox Corporation, Norwalk, CT (US)

(72) Inventors: Nan-Xing Hu, Oakville (CA); Yulin Wang, Oakville (CA); Guerino Sacripante, Oakville (CA); Edward G. Zwartz, Mississauga (CA); Richard P. N. Veregin, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 136 days.

(21) Appl. No.: 15/874,451

(22) Filed: Jan. 18, 2018

(65) Prior Publication Data

US 2019/0218437 A1    Jul. 18, 2019

(51) Int. Cl.
| | |
|---|---|
| *C09J 193/04* | (2006.01) |
| *G03G 9/093* | (2006.01) |
| *G03G 15/00* | (2006.01) |
| *G03G 9/087* | (2006.01) |
| *C09J 5/00* | (2006.01) |
| *C09K 5/02* | (2006.01) |

(52) U.S. Cl.
CPC ............... *C09J 193/04* (2013.01); *C09J 5/00* (2013.01); *C09K 5/02* (2013.01); *G03G 9/08711* (2013.01); *G03G 9/08755* (2013.01); *G03G 9/08775* (2013.01); *G03G 9/08795* (2013.01); *G03G 9/08797* (2013.01); *G03G 9/09328* (2013.01); *G03G 15/00* (2013.01); *C09J 2433/00* (2013.01); *C09J 2467/00* (2013.01); *C09J 2493/00* (2013.01)

(58) Field of Classification Search
CPC ...................................................... C09J 193/04
See application file for complete search history.

(56) References Cited

U.S. PATENT DOCUMENTS

| | | | |
|---|---|---|---|
| 6,977,101 B2 | 12/2005 | Landa et al. | |
| 9,738,759 B1 * | 8/2017 | Sacripante | ........... C08G 77/445 |
| 2012/0015594 A1 | 1/2012 | Yenneti et al. | |
| 2017/0017173 A1 * | 1/2017 | Veregin | ................ G03G 9/0821 |
| 2017/0260337 A1 * | 9/2017 | Sacripante | ........... C08G 77/445 |
| 2017/0329270 A1 * | 11/2017 | Ron | ........ G03G 15/10 |
| 2018/0210358 A1 | 7/2018 | Sacripante et al. | |

FOREIGN PATENT DOCUMENTS

WO    WO2017/067604    4/2017

* cited by examiner

*Primary Examiner* — Daniel H Lee
(74) *Attorney, Agent, or Firm* — Bell & Manning, LLC

(57) ABSTRACT

Methods of using a toner as a printable adhesive are provided. In embodiments, a method of adhering substrates is provided which comprises disposing a cold pressure fix toner comprising a phase change material on a first substrate via xerography to form an unfused layer of the cold pressure fix toner on the first substrate; placing a second substrate on the unfused layer of the cold pressure fix toner; and subjecting the cold pressure fix toner to a pressure to form a bonded article comprising the first substrate, an adhesive layer formed from the cold pressure fix toner, and the second substrate. Methods of applying an adhesive to a substrate and bonded articles are also provided.

17 Claims, No Drawings

METHOD OF USING A TONER AS A PRINTABLE ADHESIVE

BACKGROUND

Adhesives are widely used for labeling and packaging, in laminating objects such as paper, plastic, wood, and metal, as well as in electronics manufacturing where specialty adhesives are applied for the assembly of electronic components. For example, adhesives are used to create permanent or temporary graphic overlays, security documents, and decals. These adhesives are typically pre-applied on the desired parts using conventional coating or screen printing techniques, which are associated with high materials usage, high tolling and handling costs, and long production cycle time. In addition, the screen printable adhesives contain solvent media or low molecular weight monomers, which require drying or a curing step. Therefore, there is a need for a method for applying adhesives, which allows disposing the adhesive selectively on the surface on-demand, where the bonding is required, using digital printing techniques.

SUMMARY

The present disclosure provides illustrative examples of methods of using a toner as a printable adhesive.

In one aspect, methods of adhering substrates are provided. In embodiments, a method comprises disposing a cold pressure fix toner comprising a phase change material on a first substrate via xerography to form an unfused layer of the cold pressure fix toner on the first substrate; placing a second substrate on the unfused layer of the cold pressure fix toner; and subjecting the cold pressure fix toner to a pressure to form a bonded article comprising the first substrate, an adhesive layer formed from the cold pressure fix toner, and the second substrate.

In another aspect, methods of applying an adhesive to a substrate are provided. In embodiments, the method comprises providing a cold pressure fix toner comprising a phase change material comprising a mixture of a low $T_g$ amorphous resin having a $T_g$ of less than about 10° C. and a crystalline organic material having a $T_m$ in a range of from about 30° C. to about 130° C., and further wherein the cold pressure fix toner optionally comprises a high $T_g$ amorphous resin having a $T_g$ in a range of from about 40° C. to about 70° C.; disposing the cold pressure fix toner on a substrate via xerography to form an unfused layer of the cold pressure fix toner on the substrate; and applying a pressure in a range of from about 25 kgf/cm² to 400 kgf/cm² to the unfused layer of the cold pressure fix toner to form an adhesive layer on the substrate.

In another aspect, bonded articles are provided. In embodiments, a bonded article comprises at least two substrates and an adhesive layer disposed in between the two substrates, the adhesive layer formed from a cold pressure fix toner comprising a phase change material comprising a mixture of a low $T_g$ amorphous resin having a $T_g$ of less than about 10° C. and a crystalline organic material having a $T_m$ in a range of from about 30° C. to about 130° C., and further wherein the cold pressure fix toner optionally comprises a high $T_g$ amorphous resin having a $T_g$ in a range of from about 40° C. to about 70° C.

DETAILED DESCRIPTION

The present disclosure provides illustrative examples of methods of using a toner as a printable adhesive, e.g., to bond together various substrates to form bonded articles. The present methods involve certain cold pressure fix toners. As used throughout this patent specification, "cold pressure fix toner" refers to toners specifically designed for application to a substrate followed by fixing to the substrate primarily by the application of pressure, i.e., as opposed to by heating. The present methods also involve application of the cold pressure fix toners via xerography, e.g., via a xerographic printer. Thus, at least some embodiments of the present methods are more flexible, less complex, and less costly as compared to conventional coating and screen printing techniques for applying adhesive compositions. In addition, at least some embodiments of the present methods allow for the bonding of a greater variety of substrates as compared to the conventional methods.

As used throughout this patent specification, $M_n$ refers to number average molecular weight and $M_w$ refers to weight average molecular weight, both of which may be measured by Gel Permeation Chromatography (GPC). The term $T_g$ refers to glass transition temperature, which may be measured by differential scanning calorimetry (DSC). The term $T_m$ refers to melting temperature which may be measured by DSC.

In an embodiment, a method is provided which comprises disposing a cold pressure fix toner on a first substrate via xerography to form an unfused layer of the cold pressure fix toner on the first substrate, placing a second substrate on the unfused layer of the cold pressure fix toner, and subjecting the cold pressure fix toner to a pressure. As further described below, the pressure may be selected to convert the cold pressure fix toner to an adhesive layer in order to bond the first and second substrates together to form a bonded article. Prior to placing the second substrate on the unfused layer of the cold pressure fix toner, an initial pressure may be applied to the unfused layer of the cold pressure fix toner to partially fix the layer. During the bonding step or after the bonding step, heat may optionally be applied to facilitate the bonding of the first and second substrates.

Cold Pressure Fix Toners

A variety of cold pressure fix toners may be used in the present methods. In embodiments, the cold pressure fix toner comprises a phase change material comprising a mixture of a low $T_g$ amorphous resin having a $T_g$ less than about 10° C. and a crystalline organic material having a melting point in a range from about 30° C. to about 130° C. The low $T_g$ amorphous resin may have a $T_g$ in a range from about 10° C. to about −45° C. In embodiments, the cold pressure fix toner may further comprise a high $T_g$ amorphous resin having a $T_g$ in a range of from about 40° C. to about 70° C.

The cold pressure fix toner may optionally comprise a shell covering the phase change material to provide suitable toner charging properties and storage stability. The shell may comprise a high $T_g$ amorphous resin in the range of from about 40° C. to about 70° C. In the case where a high $T_g$ amorphous resin is also included in the phase change material, the high $T_g$ amorphous resin in the shell may the same or different as the high $T_g$ amorphous resin in the mixture.

In embodiments, the cold pressure fix toner comprises a phase change material comprising a mixture of a low $T_g$ amorphous resin having a $T_g$ in a range from about 10° C. to about −45° C., a crystalline organic material having a melting point in a range from about 30° C. to about 130° C., and optionally a high $T_g$ amorphous resin having a $T_g$ in a range of from about 40° C. to about 70° C. Such a phase change material may undergo a change in physical state from a solid form to a flowable phase at a modest temperature, such as from about 15° C. to about 70° C., at a pressure at as low as from about 25 kgf/cm² to about 400 kgf/cm², or from about 50 kgf/cm² to about 200 kgf/cm².

In embodiments, the phase change material undergoes a change in physical state from a solid form to a flowable phase having a viscosity lower than about $10^4$ Pa·s at a temperature in a range of from about 10° C. to about 90° C., at a pressure in the range of from about 10 kgf/cm² to about 100 kgf/cm². It is highly desirable that the toner particles do not stick together, for example in the toner cartridge during storage or shipping, or inside the printer, including in the developer housing, or on the imaging surfaces such as the photoreceptor or the intermediate transfer belt. In embodiments, the temperature required to lower the viscosity of the phase change material to about $10^4$ Pa·s at a pressure of about 25 kgf/cm² or lower, or about 10 kgf/cm², is from about 50° C. to about 90° C. In embodiments, the temperature required to lower the viscosity of the phase change material to about $10^4$ Pa·s at a pressure of about 100 kgf/cm² or higher is from about 10° C. to about 70° C. or from about 15° C. to about 50° C.

Low $T_g$ Amorphous Resin

In embodiments, the low $T_g$ amorphous resin may include an acrylic polymer, an ethylene-vinyl acetate polymer, a styrene-acrylate copolymer, a styrene-butadiene-styrene copolymer, a styrene-ethylene/butylene-styrene copolymer, a styrene-ethylene/propylene copolymer, a styrene-isoprene-styrene, a polyvinyl ether, a polyester resin, and the like, and combinations thereof.

In a specific embodiment, the low $T_g$ amorphous resin is a rosin acid-based polyester resin having Formula I:

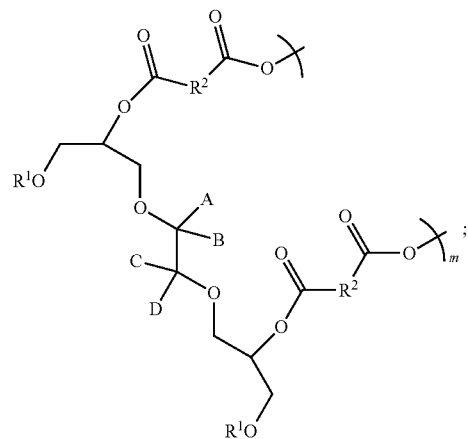

Formula I wherein $R^1$ is a rosin acid of an abietic acid, a pimaric acid, or combinations thereof, $R^2$ is $(CH_2)_n$, wherein n is an integer from 2 to 8, including 2 to 6 and 3 to 6; A, B, C, and D are independently hydrogen or methyl; and m is an integer from 10 to 10,000.

In embodiments, the $M_n$ of the amorphous polyester is from about 300 to about 1200, and the $M_w$ is from about 300 to about 2,000.

The low $T_g$ amorphous rosin acid-based polyester resins may be obtained by reacting a commercial rosin acid product (which may comprise compounds having the formula $C_{19}H_{29}COOH$ as exemplified by the family of abietic and/or pimaric acids, any of which are optionally hydrogenated, and mixtures thereof derived from tree resins) with a glycol diglycidyl ether to afford a rosin-diol which is then polymerized with aliphatic diacids to provide rosin acid-based polyester resins (I) with low $T_g$ as indicated below in Scheme 1:

Scheme 1

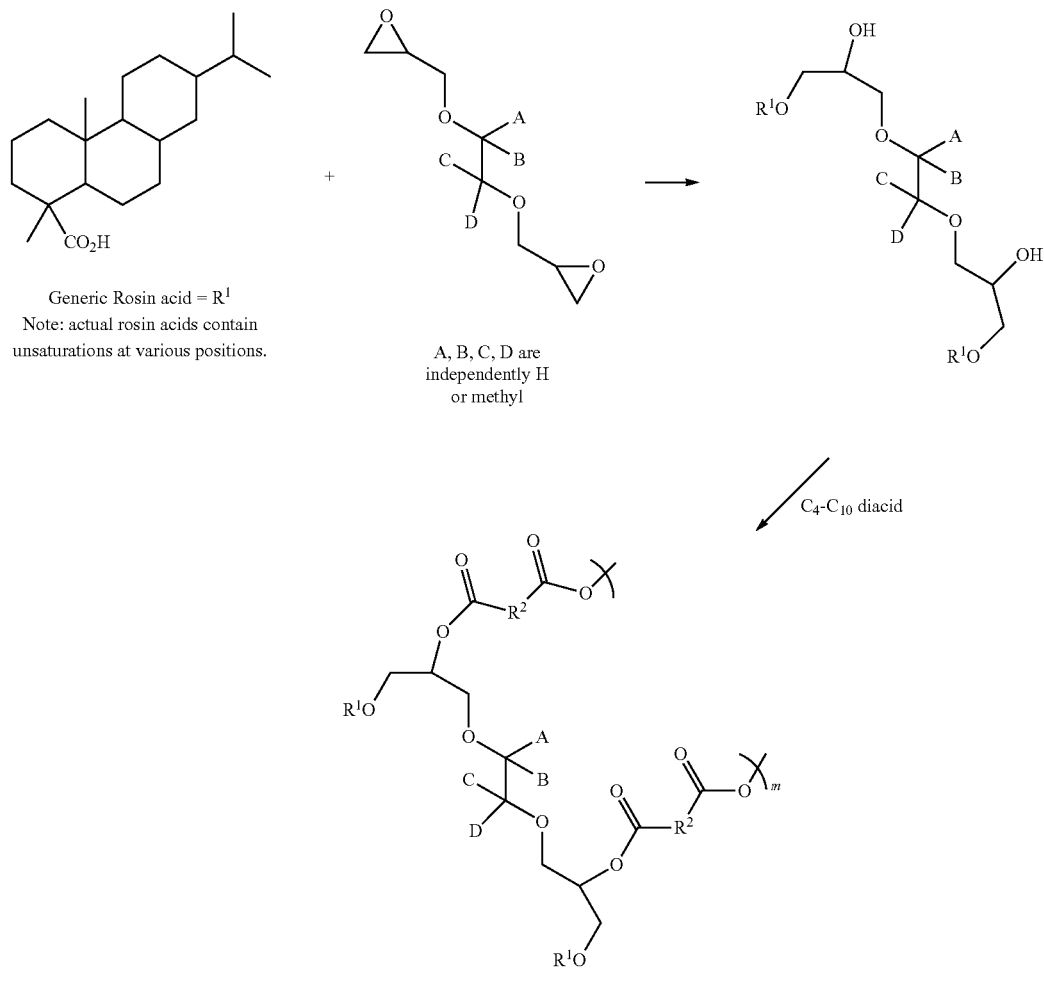

In embodiments, in compounds of Formula I, m is an integer from 10 to 10,000, or 10 to 5,000, or 10 to 1,000, or 10 to 500, or 10 to 100. In embodiments, m is an integer from 100 to 10,000, or 500 to 10,000, or 1,000 to 10,000, or 5,000 to 10,000.

Depending on the length of the aliphatic diacid component, very low to low $T_g$ resins can be obtained as demonstrated in Table 1 below.

TABLE 1

Rosin acid-based polyester resins.

| Resin | Diacid ($R_2$) | Viscosity (poise) | A.V. (mg KOH/g) | $T_g$ (° C.) | $M_n$ (kg/mole) | $M_w$ (kg/mole) |
|---|---|---|---|---|---|---|
| A/B = Me C/D = H | Sebacic; R=(CH$_2$)$_8$ | 15 | 13.5 | −43.8 | 4.8 | 17.3 |

TABLE 1-continued

Rosin acid-based polyester resins.

| Resin | Diacid ($R_2$) | Viscosity (poise) | A.V. (mg KOH/g) | $T_g$ (° C.) | $M_n$ (kg/mole) | $M_w$ (kg/mole) |
|---|---|---|---|---|---|---|
| A/B = Me C/D = H | Succinic; $R_2$=(CH$_2$)$_2$ | 61.8 | 12.8 | −6.5 | 3.7 | 15.7 |

The rosin acid-based polyester resins may use an aliphatic diacid component having from 3 to 20 carbons, 3 to 14 carbons, or 4 to 10 carbons. In embodiments, the glycol diglycidyl ether is based on 1,1-dimethyl ethylene glycol.

In embodiments, the rosin acid-based polyester resin has Formula I (above) wherein $R^1$ is an abietic acid, a pimaric acid, or combinations thereof; $R^2$ is (CH$_2$)$_n$, wherein n is an integer from 2 to 8; A, B, C, and D are independently selected from hydrogen and methyl; and m is an integer from 10 to 10,000. In embodiments, $R^1$ is selected from dehydro-abietic acid, neo-abietic acid, levo-pimaric acid, pimaric acid, sandaracopimaric acid, iso-pimaric acid, tetrahydro abietic acid and combinations thereof.

In embodiments, the rosin acid-based polyester resin has a $T_g$ in the range of from about 10° C. to about −45° C. (including from about 0° C. to about −45° C. and from about −5° C. to about −45° C.).

In embodiments, the rosin acid-based polyester is formed as follows. A 2-L buchi reactor may be charged with 356.8 g Foral AX (Rosin Acid, available from Pinova), 166 g of neopentyl glycol diglycidyl ether (available from Sigma-Aldrich), and 0.57 g of tetraethyl ammonium bromide (available from Sigma-Aldrich). The mixture may be heated to 175° C. over a three hour period with stirring under nitrogen, and then maintained at 175° C. for five more hours and until the acid value of the resulting rosin-diol (see Scheme 2) is 1.8 mg of KOH/g of resin. To the mixture may be added 306 g propylene glycol (available from Archer-Daniels Midland), 844.5 grams of sebacic acid (available from Sigma-Aldrich) and 2 g of TC400 catalyst (available from Elf-Atochem). The mixture may be slowly heated to 195° C. over a six hour period, followed by vacuum distillation until the resin viscosity is 15 and acid value of 13.5 mg of KOH/g of resin are obtained. The resin may be discharged and allowed to cool to room temperature.

Crystalline Organic Material

In embodiments, the crystalline organic material is an ester compound (including a diester compound) or a crystalline polyester. The diester compound may be a substituted phenyl or benzyl diester. Illustrative such diesters are listed in Table 2, below.

TABLE 2

Illustrative diester compounds.

| Structure | $T_m$ (° C.) | $T_{crys}$ (° C.) | $T_g$ (° C.) |
| --- | --- | --- | --- |
| | 94 | 47 | n/a |
| | 115 | 62 | n/a |
| | 74 | ~50 | n/a |
| | 102 | 51 | n/a |
| | 86 | 34 | n/a |
| | 35 | n/a | n/a |
| | 127 | 75 | n/a |

TABLE 2-continued
Illustrative diester compounds.
| Structure | $T_m$ (° C.) | $T_{crys}$ (° C.) | $T_g$ (° C.) |
|---|---|---|---|
| 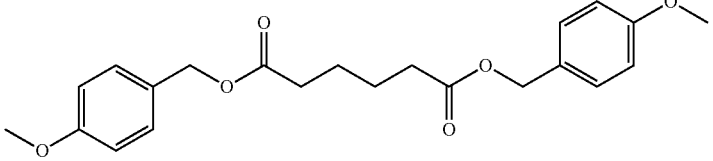 | 59 | 20-26 | n/a |
| 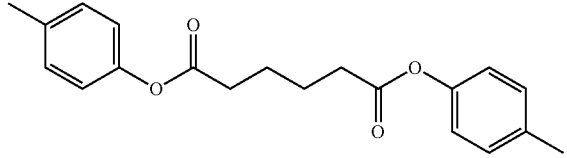 | 100 | 62 | n/a |
| 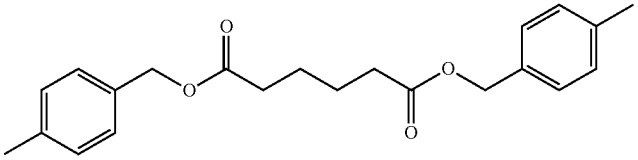 | 56 | −5 | n/a |
| 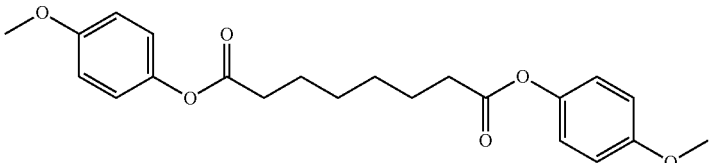 | 119 | ~75 | n/a |
| 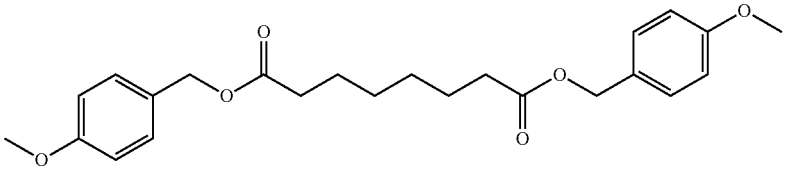 | 80 | 18 | n/a |
| 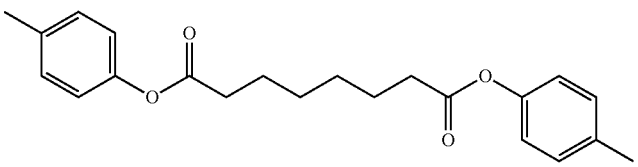 | 80, 83 | 63 | n/a |
| 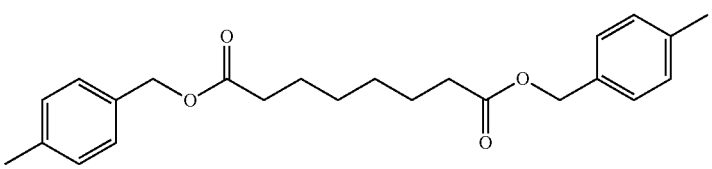 | 71 | 21 | n/a |
| 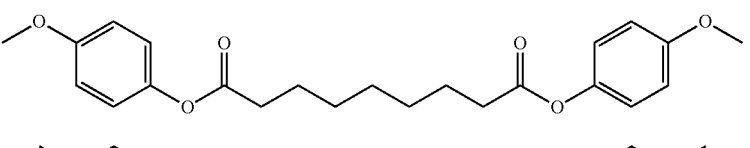 | 87 | ~50 | n/a |
| 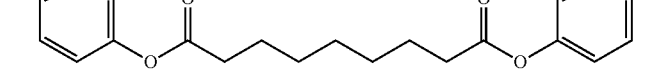 | 69 | 42 | n/a |

TABLE 2-continued

Illustrative diester compounds.

| Structure | $T_m$ (° C.) | $T_{crys}$ (° C.) | $T_g$ (° C.) |
|---|---|---|---|
| [diphenyl ester of suberic acid] | 58 | 3 | n/a |
| "DST" H₃C(H₂C)₁₇—O—[terephthalate]—O—(CH₂)₁₇CH₃ | 88 | 79 | n/a |
| "DBT" H₃C(H₂C)₂₁—O—[terephthalate]—O—(CH₂)₂₁CH₃ | 95 | 82 | n/a |
| "DPT" [bis(phenethyl) tartrate] | 110 | 83 | n/a |

In embodiments, it may be desirable to incorporate one or more acid groups, such as carboxylate or sulfonate, in the compounds of Table 2 to provide negative charge to enhance toner performance. These acid groups may also be useful so the materials may be employed in emulsion/aggregation processing to form the cold pressure fix toner. In embodiments, the acid moiety may be disposed in any position on the aromatic residues of the compounds in Table 2. In embodiments, the acid may be provided by including some amount of the monoester in place of the diester so that one end of the molecule bears an acid moiety.

In embodiments, the crystalline organic material is a diester compound made from Scheme 2 below.

Scheme 2

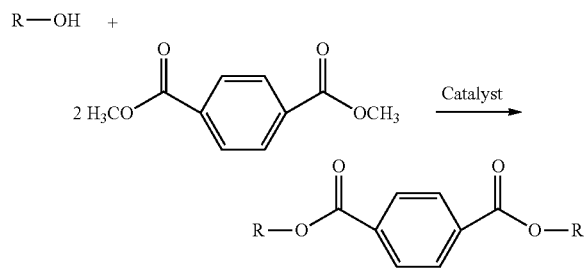

wherein R is a saturated or ethylenically unsaturated aliphatic group. In embodiments, R has at least 6 carbon atoms, at least 8 carbon atoms, no more than 100 carbon atoms, no more than 80 carbon atoms, or no more than 60 carbon atoms.

In embodiments, the diester compound is derived from natural fatty alcohols such as octanol, stearyl alcohol, lauryl alcohol, behenyl alcohol, myristyl alcohol, capric alcohol, linoleyl alcohol, and the like. Scheme 1 may be conducted by combining dimethyl terepthalate and alcohol in the melt in the presence of a tin catalyst, such as dibutyl tin dilaurate (Fascat 4202) or dibutyl tin oxide (Fascat 4100); a zinc catalyst, such as Bi cat Z; a bismuth catalyst, such as Bi cat 8124 or Bi cat 8108; or a titanium catalyst such as titanium dioxide. Only trace quantities of catalyst are required for the process. In embodiments, the catalyst is present in an amount in the range of from about 0.01 weight % to about 2 weight % or from about 0.05 weight % to about 1 weight % (based on the total weight of the product). The reaction may be carried out at an elevated temperature of from about 150° C. to about 250° C. or from about 160° C. to about 210° C. The solvent-free process is environmentally sustainable and eliminates problems with byproducts and also means higher reactor throughput.

In embodiments, the crystalline organic material may have Formula II:

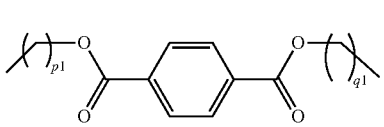

Formula II wherein p1 is from 1 to 40, and q1 is from 1 to 40. In embodiments, p1 is from 8 to 26, from 14 to 20, or from 16 to 18. In embodiments, q1 is from 8 to 26, from 14 to 20, or from 16 to 18. In embodiments, p1 is the same as q1.

In embodiments, the crystalline organic material is a polyester. Crystalline polyesters may be prepared from a diacid (or a diester thereof) and a diol. Examples of organic diols include aliphatic diols having from 2 to 36 carbon atoms, such as 1,2-ethanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, and the like.

Examples of organic diacids include oxalic acid, succinic acid, glutaric acid, adipic acid, suberic acid, azelaic acid, sebacic acid, dodecanedioic acid, phthalic acid, isophthalic acid, terephthalic acid, napthalene-2,6-dicarboxylic acid, naphthalene-2,7-dicarboxylic acid, cyclohexane dicarboxylic acid, malonic acid and mesaconic acid, or a diester or anhydride thereof. The organic diacid may be selected in an amount of, for example, from about 40 to about 50 mol % of the resin.

By way of illustration, crystalline polyesters have been prepared using 1,12-dodecanedioic acid and diols from C3 (1,3-propylene glycol) to C12 (1,12-dodecanediol). The crystalline polyesters exhibit values of $T_m$ from about 60° C. to about 90° C. Illustrative crystalline polyesters are shown in Table 3, below.

TABLE 3

Illustrative crystalline polyesters.

| Resin ID | Acid:Diol | AV mg KOH/g resin | $T_m$ (° C.) 1st | GPC (g/m × 1000) $M_w$ | $M_n$ |
|---|---|---|---|---|---|
| A | C12:C9 | 10.3 | 71.0 | 24.2 | 6.8 |
| B | C12:C6 | 14.5 | 72.3 | 14.3 | 6.1 |
| C | C12:C3 | 17 | 66.1 | 13.4 | 6.6 |

In embodiments, the crystalline polyester is characterized by a $T_m$ in the range of from about 30° C. to about 130° C. (including from 40° C. to about 100° C. and from 50° C. to about 90° C.). In embodiments, the crystalline resin is characterized by a $M_n$ of from about 1,000 to about 10,000. In embodiments, the crystalline resin is characterized by a $M_w$ in the range of from about 2,000 to about 30,000.

In embodiments, the crystalline polyester component is present in the core of the cold pressure fix toner in an amount of from about 20% to about 60% by weight of the total weight of the core.

In embodiments, the weight ratio of the crystalline resin to an amorphous component (e.g., the low $T_g$ amorphous resin) in the cold pressure fix toner is from about 50:50 to about 95:5, from about 60:40 to about 95:5, or from about 70:30 to about 90:10.

High $T_g$ Amorphous Resin

A variety of resins may be used for the high $T_g$ amorphous resin component of the cold pressure fix toners. The $T_g$ of the high $T_g$ resin is generally greater than that of the low $T_g$ amorphous polyester resin. The $T_g$ of the high $T_g$ resin is also generally sufficiently high so as to enable blocking and other desired xerographic properties of the cold pressure fix toner. In embodiments, the high $T_g$ amorphous resin has a $T_g$ in a range of from about 40° C. to about 70° C. (including from about 50° C. to about 70° C. or from about 55° C. to about 65° C.). As noted above, the high $T_g$ resin may be used to form a shell over the core of the cold pressure fix toner particles. However, an amount of the high $T_g$ resin may also be included within the core. In embodiments, the high $T_g$ resin is present in the core of the cold pressure fix toner in an amount of from about 10% to about 30% by weight of the total weight of the core.

In embodiments, the high $T_g$ resin is a styrene acrylate polymer. The styrene acrylate polymer may be a copolymer of styrene, an alkyl acrylate such as n-butyl acrylate, and β-carboxyethyl acrylate. The relative amounts of the monomer components may be adjusted to provide a desired $M_n$, $M_w$ and/or $T_g$. In embodiments, the styrene acrylate copolymer is characterized by a $T_g$ of greater than 50° C., greater than 55° C., greater than 60° C., or in the range of from greater than 50° C. to 65° C. In embodiments, the styrene acrylate copolymer is characterized by a $M_n$ of from about 5,000 to about 20,000. In embodiments, the styrene acrylate copolymer is characterized by a $M_w$ in the range of from about 15,000 to about 40,000.

Illustrative examples of other acrylate polymers that can selected for the high $T_g$ amorphous resin include, for example, poly(styrene-alkyl acrylate), poly(styrene-alkyl methacrylate), poly(styrene-alkyl acrylate-acrylic acid), poly(styrene-alkyl methacrylate-acrylic acid), poly(alkyl methacrylate-alkyl acrylate), poly(alkyl methacrylate-aryl acrylate), poly(aryl methacrylate-alkyl acrylate), poly(alkyl methacrylate-acrylic acid), poly(styrene-alkyl acrylate-acrylonitrile-acrylic acid), poly(alkyl acrylate-acrylonitrile-acrylic acid), poly(methyl methacrylate-butadiene), poly(ethyl methacrylate-butadiene), poly(propyl methacrylate-butadiene), poly(butyl methacrylate-butadiene), poly(methyl acrylate-butadiene), poly(methyl methacrylate-isoprene), poly(ethyl methacrylate-isoprene), poly(methyl acrylate-isoprene), poly(ethyl acrylate-isoprene), poly(propyl acrylate-isoprene), poly(styrene-propyl acrylate), poly(styrene-butyl acrylate), poly(styrene-butyl acrylate-acrylic acid), poly(styrene-butyl acrylate-methacrylic acid), poly(styrene-butyl acrylate-acrylonitrile), poly(styrene-butyl acrylate-acrylonitrile-acrylic acid), poly(styrene-1,3-diene-acrylic acid), poly (styrene-1,3-diene-acrylonitrile-acrylic acid), poly (styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylononitrile), poly(styrene-butyl acrylate-acrylonitrile-acrylic acid), poly(styrene-butyl methacrylate), poly(styrene-butyl methacrylate-acrylic acid), poly(butyl methacrylate-acrylic acid), poly(acrylonitrile-butyl acrylate-acrylic acid), and mixtures thereof. The alkyl group in the aforementioned polymers may be any alkyl group, and in particular may be a $C_1$-$C_{12}$ alkyl group, for example including methyl, ethyl, propyl and butyl.

In embodiments, the high $T_g$ amorphous resin is an amorphous polyester. The amorphous polyester may be formed by reacting a diol with a diacid in the presence of an optional catalyst. Examples of diacids or diesters, including vinyl diacids or vinyl diesters, utilized for the preparation of amorphous polyesters include dicarboxylic acids or diesters such as terephthalic acid, phthalic acid, isophthalic acid, fumaric acid, dimethyl fumarate, dimethyl itaconate, cis, 1,4-diacetoxy-2-butene, diethyl fumarate, diethyl maleate, maleic acid, succinic acid, itaconic acid, succinic acid, succinic anhydride, dodecylsuccinic acid, dodecylsuccinic anhydride, glutaric acid, glutaric anhydride, adipic acid, pimelic acid, suberic acid, azelaic acid, dodecane diacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and combinations thereof. The organic diacid or diester may be present, for example, in an amount from about 40 to about 60 mole percent of the resin, in embodiments from about 42 to about 52 mole percent of the resin, in embodiments from about 45 to about 50 mole percent of the resin.

Examples of diols which may be utilized in generating the amorphous polyester include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis (hydroxyethyl)-bisphenol A, bis(2-hydroxypropyl)-bisphenol A, 1,4-cyclohexanedimethanol, 1,3-cyclohexanedimethanol, xylenedimethanol, cyclohexanediol, diethylene glycol, bis(2-hydroxyethyl) oxide, dipropylene glycol, dibutylene, and combinations thereof. The amount of organic diol selected can vary, and may be present, for example, in an amount from about 40 to about 60 mole percent of the resin, in embodiments from about 42 to about 55 mole percent of the resin, in embodiments from about 45 to about 53 mole percent of the resin.

In embodiments, the high $T_g$ amorphous resin is an unsaturated amorphous polyester. Examples of such resins include those disclosed in U.S. Pat. No. 6,063,827, the disclosure of which is hereby incorporated by reference in its entirety. Exemplary unsaturated amorphous polyester resins include, but are not limited to, poly(propoxylated bisphenol co-fumarate), poly(ethoxylated bisphenol co-fumarate), poly(butyloxylated bisphenol co-fumarate), poly (co-propoxylated bisphenol co-ethoxylated bisphenol co-fumarate), poly(1,2-propylene fumarate), poly(propoxylated bisphenol co-maleate), poly(ethoxylated bisphenol co-maleate), poly(butyloxylated bisphenol co-maleate), poly(co-propoxylated bisphenol co-ethoxylated bisphenol co-maleate), poly(1,2-propylene maleate), poly(propoxylated bisphenol co-itaconate), poly(ethoxylated bisphenol co-itaconate), poly(butyloxylated bisphenol co-itaconate), poly(co-propoxylated bisphenol co-ethoxylated bisphenol co-itaconate), poly(1,2-propylene itaconate), and combinations thereof.

In embodiments, the high $T_g$ amorphous resin may be an amorphous polyester such as a poly(propoxylated bisphenol A co-fumarate) resin having Formula III:

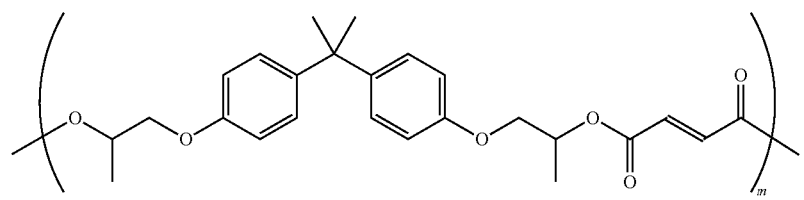

Formula III wherein m may be from about 5 to about 1000. Examples of such resins and processes for their production include those disclosed in U.S. Pat. No. 6,063,827, the disclosure of which is hereby incorporated by reference in its entirety.

The cold pressure fix toners may include other components, such as a tackifier or another resin, to provide desired bonding performance. Illustrative tackifiers include rosin esters, polyterpenes, terphene phenolics, combinations thereof, and the like. Other illustrative tackifiers include one or more of the following: aliphatic C5 monomer resin, PICCOTAC™ 1095, hydrogenated C5 monomer resin EASTOTAC™ H-100R, EASTOTAC™ H-100L Resin, EASTOTAC™ H-100W Resin, C9 monomer resins KRISTALEX™ 1120, PICCOTEX™ 75, PICCOTEX™ LC, PICCOTEX™ 100 Hydrocarbon Resin, styrenic C8 monomers resins PICCOLASTIC™ A5, PICCOLASTIC™ A75, hydrogenated, C9 aromatic monomer resins REGALITE™ S1100, partially hydrogenated, C9 aromatic monomer resins REGALITE™ 55100, REGALITE™ S7125, REGALITE™ R1100, REGALITE™ R7100, REGALITE™ R1090, REGALITE™ R1125, REGALITE™ R9100, mixed C5 aliphatic and C9 aromatic monomer resins PICCOTAC™ 8095, PICCOTAC™ 9095, PICCOTAC™ 7050, aromatic hydrocarbon resins, REGALREZ™ 1094, hydrogenated C9 monomer aromatic hydrocarbon resins, REGALREZ™ 1085, partially hydrogenated, C9 aromatic monomer resin REGALREZ™ all from Eastman; Aliphatic C5 modified petroleum resin WINGTACK® 10, WINGTACK® 95, WINGTACK® 98, WINGTACK® 86, aromatically modified petroleum resin WINGTACK® ET and aromatically modified petroleum resin WINGTACK® STS all from Cray Valley. Illustrative examples of the resin selected to improve bonding performance may include, for example, an acrylic, urethane, phenolic, polyamide, polyimide, epoxy, rosin esters, polyterpenes, or mixtures thereof.

In embodiments, the tackifier or another resin is present in the cold pressure fix toner in an amount of from about 1% to about 40% by weight of the total weight of the cold pressure fix toner.

Although other additives may be present in the cold pressure fix toners, in embodiments, the toners do not comprise (i.e., are free of) a colorant. As such, the cold pressure fix toners may be characterized as clear toners.

The cold pressure fix toners can be prepared from the resins described above by any means, including conventional extrusion and grinding, suspension, SPSS (Spherical Polyester Toner by Suspension of Polymer/Pigment Solution and Solvent Removal Method, as described in Journal of the Imaging Society of Japan, Vol. 43, 1, 48-53, 2004), incorporated in an N-Cap toner, or emulsion aggregation. As needed, the resins may be provided as latexes prepared by solvent flash or by phase inversion emulsification, including by solvent free methods.

The cold pressure fix toners may be used as is or may be formulated into a developer composition further comprising carrier particles.

Other cold pressure fix toners may be used, including the toners (and components thereof) described in U.S. Pat. No. 9,738,759 and U.S. Pat. Pub. No. 20170017173, each of which is incorporated by reference in its entirety.

Xerographic Application and Substrate Bonding

As noted above, a first step of the present methods involves disposing any of the cold pressure fix toners on a first substrate (e.g., directly on the first substrate) in an imagewise fashion via xerography to form an unfused layer of the cold pressure fix toner on the first substrate. The term "xerography" refers to the process of printing via any type of xerographic printer. Any type of such xerographic printer may be used to dispose the cold pressure fix toners on the first substrate. However, in the first step of the present methods, the cold pressure fix toner is left unfused, i.e., is not subjected to pressure or heat (or any pressure/heat is sufficiently incidental so that no substantial fusing occurs). This may be accomplished by using a xerographic printer with the fusing fixture removed or otherwise disabled.

The term "layer" is not intended to convey a particular shape or dimension. In the xerographic printing of toners, any number of images may be printed. Similarly, the unfused layer of cold pressure fix toner may assume a variety of shapes or dimensions. In addition, the term "layer" also refers to both continuous layers in which some area of the first substrate is entirely covered with the cold pressure fix toner as well as patterned layers in which some areas of the first substrate are covered and others are bare. The particular form of the layer depends upon where adhesion is desired between the first substrate and an overlying second substrate. The amount of the cold pressure fix toner in the layer, as measured by toner mass per unit area (TMA), may be in the range of from about 0.1 mg/cm$^2$ to 2 mg/cm$^2$ or more.

Regarding the first and second substrates, any type of substrate material may be used provided it is compatible with the selected xerographic printer. The terms "first" and "second" can refer to individual, distinct substrates. In other embodiments, the terms can refer to different portions of the same substrate. By way of illustration, the cold pressure fix toner may be disposed on a portion of a substrate and the substrate folded to position a different portion of the same substrate over the unfused layer of the cold pressure fix toner. In addition, this different portion may itself comprise unfused cold pressure fix toner applied via xerographic printing as described herein.

After application of the cold pressure fix toner to form the unfused layer, the second substrate is placed thereon (e.g., directly thereon). Next, the cold pressure fix toner is subjected to a pressure. This step may be accomplished via one or more fixing rolls (e.g., as part of a cold pressure fixture) by passing the first and second substrates under (or over or through) the fixing roll(s) at a selected speed. Illustrative fixing rolls include cylindrical metal rolls, which optionally may be coated with fluorine containing resins such as TEFLON® PTFE polytetrafluoroethylene resins, TEFLON® PFA perfluoroalkoxy resins, TEFLON® FEP a fluorinated ethylene propylene, DUPONT™ TEFLON® AF amorphous fluoroplastic resins, and silicon resins, or a combination of the different resins. Other fixing rolls such as those described in U.S. Pat. No. 8,541,153, which is incorporated by reference in its entirety, may also be used.

Subjecting the cold pressure fix toner to the pressure effectively converts the unfused layer to an adhesive layer, which bonds the first and second substrates together to form a bonded article. The pressure may be selected so as to achieve this conversion and thus, this bonding. In embodiments, the applied pressure is about 100 kgf/cm$^2$ or greater. This includes embodiments in which the applied pressure is about 200 kgf/cm$^2$ or greater or about 400 kgf/cm$^2$ or greater. In embodiments, no heat is applied during this bonding step (or any heat is sufficiently incidental so as not to materially affect the bonding process). However, in other embodiments, during this bonding step or after this bonding step, heat (e.g., via a lamp or the like) may be applied to facilitate bonding.

In embodiments, prior to placing the second substrate on the unfused layer of the cold pressure fix toner, an initial pressure may be applied to the unfused layer of the cold pressure fix toner to partially fix the layer. However, this initial pressure is generally less than the subsequent pressure applied to achieve bonding of the first and second substrates. In embodiments, the initial pressure applied to achieve partial fixing is less than about 400 kgf/cm$^2$. This includes embodiments in which the initial pressure applied is less than about 200 kgf/cm$^2$ or less than about 150 kgf/cm$^2$. The pressure may be applied as described above.

The present methods find use in a variety of applications. Illustrative applications include the following: sealing documents in which a cold pressure fix toner is applied by xerographic printing onto an edge of a printed document, the edges are folded together, and the folded edges are bonded together as described above; peel-apart post cards in which a cold pressure fix toner is applied by xerographic printing onto a region of a postcard (e.g., containing printed information to be hidden), a flap of the postcard is placed over the region, and the flap and postcard are bonded together as described above; or a peel-to-reveal label in which a cold pressure fix toner is applied by xerographic printing onto a region of a label (e.g., containing printed information to be hidden), a flap of the label is placed over the region, and the flap and label are bonded together as described above.

The bonded articles produced by the present methods are also encompassed by the present disclosure. Thus, in an embodiment, a bonded article comprises a first substrate, a second substrate, and an adhesive layer between the first and second substrates, wherein the adhesive layer is formed from any of the cold pressure fix toners described herein.

EXAMPLE

The following Example is being submitted to illustrate various embodiments of the present disclosure. The Example is intended to be illustrative only and is not intended to limit the scope of the present disclosure. Also, parts and percentages are by weight unless otherwise indicated. As used throughout this patent specification, "room temperature" refers to a temperature of from about 20° C. to about 25° C.

Two clear cold pressure fix toners were prepared and used as xerographic printable adhesives for an illustrative demonstration of the present disclosure.

Latex Preparation:

A latex of 156.6 nm size was prepared by co-emulsification of a 50/50 ratio of a crystalline polyester (C10/C6 CPE (poly-1,6-hexylene-dodecanoate) (AV=10.2 mg KOH/g resin)) and a low $T_g$ polyester resin, a rosin acid-based polyester prepared according to Scheme I (GS 1462 (AV=13.5 mg KOH/g resin)). The co-emulsification was carried out using a solvent-free phase inversion technique. Specifically, 100 grams of C10/C6 CPE resin, 100 grams of GS1462 resin, 9.98 grams of a surfactant, Tayka available from the Tayca Corporation (60 weight %), and 6.69 grams of triethylamine were measured into a 2 liter Buchi glass reactor. The reactor was heated to 105° C. over 10 minutes. An agitator was started to stir the mixture slowly (around 60 rpm) when the reactor temperature was above 65° C. The stirring speed was increased to 200 rpm when the temperature was above 95° C. and 320 grams of deionized water was fed into reactor at around 3.5 grams per minute using an FMI Lab Pump (Model Q3-20). The reactor was cooled down to 25° C. and the latex was discharged and screened through a 25 micron sieve. The resulting resin emulsion was composed of about 37.12 weight % solids in water, and had a volume average diameter of about 167.9 nanometers as measured with a HONEYWELL MICROTRAC® UPA150 particle size analyzer.

Toner Preparation:

Into a 2 liter glass reactor equipped with an overhead stirrer 37.39 grams of styrene acrylate latex and 140.99 grams of the latex prepared as described above were added. The styrene acrylate latex was 41.72 weight % solids in water. The styrene acrylate resin was composed of 79 weight % styrene, 18 weight % n-butyl acrylate, and 3.0 weight %

β-carboxyethyl acrylate and was characterized by a $T_g$ of 63.2° C., an $M_n$ of 13,050 g/mole and an $M_w$ of 36,562 g/mole. The two latexes were evenly mixed, the pH of the mixture was adjusted to 2.63 and then stirred at 4000 rpm using an IKA Ultra-Turrax homogenizer. Next, 19.11 grams of aluminum sulphate solution was added dropwise as a flocculent and with continued homogenization. After, the resulting mixture was heated from room temperature to 45° C. at a rate of 1° C. per minute with stirring at about 200 rpm. The particle size was monitored with a Coulter Counter until the core particles reached a volume average particle size of 8.68 μm. Then, 20.54 grams of the same styrene acrylate latex EP07 was added as shell material, resulting in core-shell structured particles with a volume average particle size of 8.95 μm. Thereafter, the pH of the reaction slurry was increased to 7.8 using 1.74 grams of EDTA (39 weight %) and 18.80 grams of 1 M NaOH solution to freeze the toner growth. After freezing, the reaction mixture was heated to 65.0° C. and the pH of mixture decreased to 7.58 using 0.3 M $HNO_3$. Thereafter, the reaction mixture was maintained at this temperature for a total of 30 minutes for coalescence. The toner was quenched. The particles had a volume average particle size of 8.77 μm. The toner slurry was then cooled to room temperature, separated by sieving (25 μm), filtration, followed by washing and freeze dried.

Adhesive Application Procedure:

The toner obtained above was blended with a standard additive package containing 40 nm titania, 120 nm sol-gel silica, 40 nm silica, ZnSt and cerium dioxide. The resulting developer was placed in a modified Color 560 printer to generate unfused images (approximately 1.0 mg/cm²) onto Xerox Bold 90 gsm (uncoated) and 120 gsm coated paper. A second sheet of paper was then placed on top of the unfused toner before being tested, followed by passing through an in-house cold press fixture (46 mm/s) with the nip pressure set to 1500 psi in order to bond the two sheets of paper together. The bonded sheets of paper were peeled apart with a peel force similar to that provided by the adhesive on Post-It® notes.

It will be appreciated that variants of the above-disclosed and other features and functions or alternatives thereof, may be combined into many other different systems or applications. Various presently unforeseen or unanticipated alternatives, modifications, variations or improvements therein may be subsequently made by those skilled in the art, which are also intended to be encompassed by the following claims.

What is claimed is:

1. A method of adhering substrates, the method comprising:
   disposing a cold pressure fix toner comprising a phase change material on a first substrate via xerography to form an unfused layer of the cold pressure fix toner on the first substrate;
   placing a second substrate on the unfused layer of the cold pressure fix toner; and
   subjecting the cold pressure fix toner to a pressure to form a bonded article comprising the first substrate, an adhesive layer formed from the cold pressure fix toner, and the second substrate.

2. The method of claim 1, wherein, prior to placing the second substrate on the first substrate, the method further comprises disposing the cold pressure fix toner on the second substrate via xerography to form an unfused layer of the cold pressure fix toner on the second substrate.

3. The method of claim 1, wherein the pressure applied is about 100 kgf/cm² or greater.

4. The method of claim 1, wherein heat is applied during or after subjecting the cold pressure fix toner to the pressure.

5. The method of claim 1, wherein prior to subjecting the cold pressure fix toner to the pressure, an initial pressure is applied to the unfused layer of the cold pressure fix toner to partially fix the layer, wherein the initial pressure is less than the subsequent pressure applied.

6. The method of claim 1, wherein the phase change material of the cold pressure fix toner comprises a mixture of a low $T_g$ amorphous resin having a $T_g$ of less than about 10° C. and a crystalline organic material having a $T_m$ in a range of from about 30° C. to about 130° C., and further wherein the cold pressure fix toner optionally comprises a high $T_g$ amorphous resin having a $T_g$ in a range of from about 40° C. to about 70° C.

7. The method of claim 6, wherein the cold pressure fix toner further comprises a shell over the phase change material, the shell comprising an amorphous resin having a $T_g$ in a range of from about 40° C. to about 70° C., the amorphous resin of the shell being the same or different from the high $T_g$ amorphous resin.

8. The method of claim 7, wherein the cold pressure fix toner comprises the high $T_g$ amorphous resin, either in the phase change material or the shell, and the high $T_g$ amorphous resin has an acid value in the range of from about 7 milligrams to about 25 milligrams KOH/gram of resin.

9. The method of claim 7, wherein the cold pressure fix toner comprises the high $T_g$ amorphous resin, either in the phase change material or the shell, and the high $T_g$ amorphous resin is polyester or a copolymer formed from monomers selected from the group consisting of styrene, substituted styrene, alkyl (C1-C6) (meth)acrylates, cycloalkyl (meth)acrylates, (meth)acrylic acid, 2-carboxyethyl acrylate, and mixtures thereof.

10. The method of claim 6, wherein the low $T_g$ amorphous resin is a polyester.

11. The method of claim 6, wherein the low $T_g$ amorphous resin is a rosin acid-based polyester resin having Formula I,

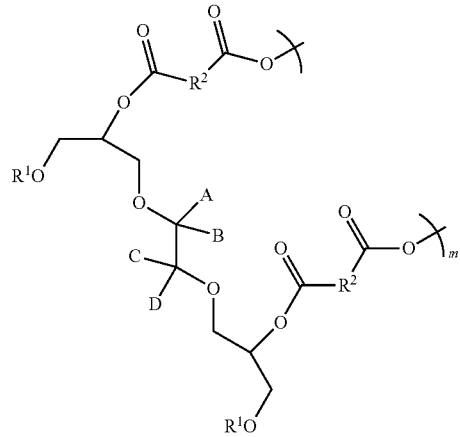

Formula I wherein $R^1$ is an abietic acid, a pimaric acid, or combinations thereof; $R^2$ is $(CH_2)_n$, wherein n is an integer from 2 to 8; A, B, C, and D are independently selected from hydrogen and methyl; and m is an integer from 10 to 10,000.

12. The method of claim 11, wherein $R^1$ is selected from dehydro-abietic acid, neo-abietic acid, levo-pimaric acid, pimaric acid, sandaracopimaric acid, iso-pimaric acid, tetrahydro abietic acid and combinations thereof.

13. The method of claim 6, wherein the crystalline organic material is an ester compound or a crystalline polyester.

14. The method of claim 6, wherein the cold pressure fix toner further comprises a tackifier or another resin selected from the group consisting of an acrylic, urethane, phenolic, polyamide, polyimide, epoxy, rosin esters, polyterpenes, or mixtures thereof.

15. The method of claim 1, wherein the phase change material undergoes a change in physical state from a solid form to a flowable phase having a viscosity lower than about $10^4$ Pa·s at a temperature in a range of from about 10° C. to about 90° C., at a pressure in a range of from about 10 kgf/cm$^2$ to about 100 kgf/cm$^2$.

16. The method of claim 15, wherein the temperature required to lower the viscosity to about $10^4$ Pa·s at a pressure of about 100 kgf/cm$^2$ is from about 15° C. to about 70° C.

17. The method of claim 15, wherein the temperature required to lower the viscosity to about $10^4$ Pa·s at a pressure of about 10 kgf/cm$^2$ is from about 50° C. to about 90° C.

* * * * *